(12) United States Patent
Amjadi et al.

(10) Patent No.: US 11,312,899 B2
(45) Date of Patent: Apr. 26, 2022

(54) COMPOSITE POLYMER/PEROVSKITE QUANTUM DOTS LUMINESCENT MATERIAL

(71) Applicants: Ahdieh Amjadi, Tabriz (IR); Tahereh Ashjari, Tehran (IR); Farzaneh Arabpour Roghabadi, Tehran (IR); Vahid Ahmadi, Tehran (IR); Mahdi Salami hosseini, Tabriz (IR); Kiyumars Jalili, Tabriz (IR)

(72) Inventors: Ahdieh Amjadi, Tabriz (IR); Tahereh Ashjari, Tehran (IR); Farzaneh Arabpour Roghabadi, Tehran (IR); Vahid Ahmadi, Tehran (IR); Mahdi Salami hosseini, Tabriz (IR); Kiyumars Jalili, Tabriz (IR)

(73) Assignee: TARBIAT MODARES UNIVERSITY, Tehran (IR)

( * ) Notice: Subject to any disclaimer, the term of this patent is extended or adjusted under 35 U.S.C. 154(b) by 0 days.

(21) Appl. No.: 16/750,008

(22) Filed: Jan. 23, 2020

(65) Prior Publication Data

US 2020/0157421 A1 May 21, 2020

Related U.S. Application Data

(60) Provisional application No. 62/795,589, filed on Jan. 23, 2019.

(51) Int. Cl.
*C09K 11/02* (2006.01)
*C09K 11/06* (2006.01)

(52) U.S. Cl.
CPC ............. *C09K 11/02* (2013.01); *C09K 11/06* (2013.01); *C09K 2211/10* (2013.01)

(58) Field of Classification Search
CPC ...... C09K 11/02; C09K 11/06; C09K 2211/10
See application file for complete search history.

(56) References Cited

U.S. PATENT DOCUMENTS

| | | | | |
|---|---|---|---|---|
| 2008/0297878 A1* | 12/2008 | Brown | ................. | B82Y 10/00 359/263 |
| 2012/0045850 A1* | 2/2012 | Aimiya | ................. | C09K 11/59 436/501 |
| 2016/0116839 A1* | 4/2016 | Meyers | ................. | G03F 7/0042 430/11 |
| 2017/0156227 A1* | 6/2017 | Heo | ..................... | H05K 5/03 |
| 2018/0267208 A1* | 9/2018 | Shih | ................. | B29D 11/00365 |
| 2018/0298278 A1* | 10/2018 | Zhong | ................ | C09K 11/025 |
| 2019/0284469 A1* | 9/2019 | Laskowski | ............. | C09K 11/70 |
| 2020/0115629 A1* | 4/2020 | Chen | ................... | C09K 11/664 |

* cited by examiner

*Primary Examiner* — Austin Murata
(74) *Attorney, Agent, or Firm* — Bajwa IP Law Firm; Haris Zaheer Bajwa (57) ABSTRACT

A composite luminescent material synthesized by forming a precursor solution, forming a perovskite quantum dot/polymer composite by transferring the precursor solution onto a first substrate, and forming a composite luminescent material by coating the perovskite quantum dot/polymer composite with a polydimethylsiloxane (PDMS) solution. An exemplary precursor solution may be formed by obtaining a first solution by dissolving a polymer in a first organic solvent, obtaining a second solution by mixing an inorganic metal halide solution and an organic amine halide solution, and mixing the first solution and the second solution.

20 Claims, 9 Drawing Sheets

COMPOSITE POLYMER/PEROVSKITE QUANTUM DOTS LUMINESCENT MATERIAL

CROSS-REFERENCE TO RELATED APPLICATION

This application claims the benefit of priority from U.S. Provisional Patent Application Ser. No. 62/795,589, filed on Jan. 23, 2019, and entitled "FABRICATION OF STABLE FLEXIBLE NANOCOMPOSITES BASED ON POLYMER/PEROVSKITE QDS AND THEIR APPLICATIONS IN OPTOELECTRONIC DEVICES," which is incorporated herein by reference in its entirety.

TECHNICAL FIELD

The present disclosure relates to perovskite nanomaterial-based composite luminescent materials. Particularly, the present disclosure is related to a method for synthesizing polymer/perovskite quantum dots nanocomposites. More particularly, the present disclosure is directed to polymer/perovskite quantum dots nanocomposites and applications thereof in leak detection in fluid transportation, storage and ultraviolet light (UV) detection.

BACKGROUND

Organic-inorganic hybrid halide perovskites (PSKs) have a general formula of $ABX_3$, where A may be $CHNH_3$ or Cs, B may be Pb or Sn, and X may be Cl, Br, or I. PSKs are light-weight and low-cost materials with advantageous properties such as possessing a tunable band gap, ambipolar properties, long charge-carrier diffusion lengths, and solution processability.

Hybrid PSKs were first used as sensitizers in dye-sensitized solar cells, and subsequently, highly efficient PSK solar cells were fabricated with a power conversion efficiency up to 22%. PSK solar cells exhibit excellent light-emitting properties such as low non-radiative recombination rates, high photoluminescence quantum yield (PLQY), and emitting spectrally narrow light with high color purity. However, photoluminescence (PL) and electroluminescence (EL) efficiencies of the hybrid PSK bulk films are limited by a low exciton binding energy (Eb) of the PSK bulk grains. For example, Eb of $CH_3NH_3PbBr_3$ is approximately 76 meV. PL and EL efficiencies of hybrid PSK bulk films are further limited by low PLQYs of the hybrid PSK bulk films. Low Eb and PLQY may be due to the presence of electrical shunt paths caused by pinholes in PSK films and rough surface of the PSK films, and by a large number of intrinsic defects caused by nonuniform micrometer-sized crystal grains of the hybrid PSK bulk films.

PSK quantum dots (QDs) may be utilized instead of PSK bulk film to overcome the aforementioned shortcomings of the PSK bulk films. Halide PSK QDs with average sizes less than the exciton Bohr diameter, i.e., less than 10 nanometers, exhibit high Eb and low exciton diffusion length that may provide high PLQYs. Different types of PSK QDs may be synthesized by a colloidal synthesis method. These PSK QDs may show PLQYs of up to 95% and may mostly be employed as emitter layers in perovskite light-emitting diodes (PLEDs). However, colloidally synthesized PSK QDs may need to be extracted from the colloidal solution and carefully purified to remove excess precursors and surfactants, before they can be used as emitter films. Moreover, halide PSKs are mostly unstable in some solvents such as N, N-dimethylformamide (DMF), ethanol, and methanol. This instability of the halide PSKs in the aforementioned solvents may make purification of the synthesized PSK QDs from the colloidal solution challenging. Furthermore, although a fast recombination rate of 1-4 ns has been reported for colloidal nanocrystals passivated with organic surfactants due to a strong charge carrier confinement, their PLQY was significantly diminished to less than 20% upon the formation of the colloidal nanocrystals in the form of a thin film due to aggregation of nanocrystals. Therefore, it is quite challenging to obtain thin films of colloidal perovskite nanocrystals that may retain high PLQYs.

Another approach for synthesizing highly luminescent materials based on perovskites may be synthesizing polymer films that contain perovskite nanomaterials. However, these polymer composite luminescent materials that contain perovskite nanoparticles may exhibit low PLQYs and poor stability. Such shortcomings may be due to current synthesis methods that, as was mentioned above, may require time-consuming and complex extraction and purification steps. For example, synthesizing a perovskite nanomaterial-based polymer composite utilizing current synthesis methods may require the removal of a large amount of organic solvent. These separation and purification steps may adversely affect the luminescent properties of the perovskite nanomaterials and may also affect the dispersion of the perovskite nanomaterials in the polymer matrix.

Another challenge in synthesizing highly luminescent materials based on perovskite may be the fact that perovskite nanomaterials are strongly sensitive to water and may rapidly decompose when they come in contact with water. There is, therefore a need in the art for an in-situ fabrication method for synthesizing perovskite nanomaterial-based polymer composites without complex separation and purification steps, that therefore may allow for overcoming the aforementioned shortcomings of the current synthesis methods. There is further a need for a synthesis method that may allow for coating or encapsulating perovskite nanomaterial-based polymer composites within a stable water-resistant and atmosphere-resistant material that may allow for protecting the perovskite nanomaterials from being decomposed in contact with moisture. As used herein, a water-resistant and atmosphere resistant material may refer to a material that does not decompose when exposed to water or atmosphere.

SUMMARY

This summary is intended to provide an overview of the subject matter of the present disclosure and is not intended to identify essential elements or key elements of the subject matter, nor is it intended to be used to determine the scope of the claimed implementations. The proper scope of the present disclosure may be ascertained from the claims set forth below in view of the detailed description and the drawings.

According to one or more exemplary embodiments, the present disclosure is directed to a method for synthesizing a composite luminescent material. An exemplary composite luminescent material may be synthesized by forming a precursor solution, forming a perovskite quantum dot/polymer composite by transferring the precursor solution onto a first substrate, and forming a composite luminescent material by coating the perovskite quantum dot/polymer composite with a polydimethylsiloxane (PDMS) solution. An exemplary precursor solution may be formed by obtaining a first solution by dissolving a polymer in a first organic solvent, obtaining a second solution by mixing an inorganic metal halide solution and an organic amine halide solution, and mixing the first solution and the second solution.

In an exemplary embodiment, forming an exemplary perovskite quantum dot/polymer composite may further include obtaining a perovskite quantum dot/polymer composite powder by separating the formed perovskite quantum dot/polymer composite from the first substrate, and coating the exemplary perovskite quantum dot/polymer composite with a polydimethylsiloxane (PDMS) solution. In an exemplary embodiment, coating the exemplary perovskite quantum dot/polymer composite with a PDMS solution may include obtaining a third solution by mixing the perovskite quantum dot/polymer composite powder with a PDMS solution, and spin-coating the third solution onto a second substrate.

In an exemplary embodiment, transferring an exemplary precursor solution onto an exemplary first substrate may include transferring the exemplary precursor solution onto an exemplary paper substrate. In an exemplary embodiment, coating the exemplary perovskite quantum dot/polymer composite with the PDMS solution may include dip-coating the perovskite quantum dot/polymer composite formed on the paper substrate with the PDMS solution by dip-coating the paper substrate into the PDMS solution.

BRIEF DESCRIPTION OF THE DRAWINGS

The novel features which are believed to be characteristic of the present disclosure, as to its structure, organization, use and method of operation, together with further objectives and advantages thereof, will be better understood from the following drawings in which a presently preferred embodiment of the present disclosure will now be illustrated by way of example. It is expressly understood, however, that the drawings are for the purpose of illustration and description only and are not intended as a definition of the limits of the present disclosure. Embodiments of the present disclosure will now be described by way of example in association with the accompanying drawings in which.

DETAILED DESCRIPTION

The novel features which are believed to be characteristic of the present disclosure, as to its structure, organization, use and method of operation, together with further objectives and advantages thereof, will be better understood from the following discussion.

The present disclosure is directed to exemplary embodiments of a method for synthesizing stable and water-resistant and atmosphere-resistant perovskite nanomaterial-based composite luminescent materials. In an exemplary embodiment, a perovskite nanomaterial-based composite luminescent material and a method for synthesizing a perovskite nanomaterial-based composite luminescent material are disclosed. An exemplary perovskite nanomaterial-based composite luminescent material may include a perovskite quantum dot/polymer composite in which perovskite quantum dots may be formed in-situ without a need for complex separation or purification steps. An exemplary perovskite quantum dot/polymer composite may further be coated by or otherwise be encapsulated in a water-resistant and atmosphere-resistant polymer to obtain an exemplary stable and water-resistant and atmosphere-resistant perovskite nanomaterial-based composite luminescent material.

Specifically, utilizing an exemplary synthesis method may aid in improving photoluminescence stability and water-resistance of a perovskite nanomaterial-based composite luminescent material. In an exemplary embodiment, an exemplary water-resistant and atmosphere-resistant and transparent polymer, such as polydimethylsiloxane (PDMS), of the exemplary perovskite nanomaterial-based composite luminescent material may aid in further stabilizing an exemplary perovskite quantum dot/polymer composite against impact from water and humidity. Accordingly, the exemplary perovskite nanomaterial-based composite luminescent material may be utilized in wet or humid environments, such as pipelines and other vessels that are utilized in, for example, the oil industry. Specifically, an exemplary perovskite quantum dot/polymer composite may be synthesized utilizing a transparent polymer, such as polyvinylpyrrolidone (PVP) as a polymer matrix, which may allow for maintaining PL intensity of the exemplary perovskite quantum dots. An exemplary as-synthesized perovskite quantum dot/polymer composite may further be coated by a transparent water-resistant and atmosphere-resistant polymer, such as PDMS, which may further allow for making the exemplary perovskite quantum dot/polymer composite water-resistant and atmosphere-resistant, while still maintaining the PL intensity of the as-synthesized perovskite quantum dot/polymer composite. As a result, an exemplary perovskite nanomaterial-based composite luminescent material may be synthesized with a high photoluminescence quantum yield, which is water-resistant and atmosphere-resistant and may be utilized in wet environments.

In an exemplary embodiment, in terms of photoluminescence quantum yield, by synthesizing exemplary perovskite quantum dots in situ within a highly transparent polymer such as PVP, complex separation and purification steps of conventional colloidal synthesis methods may be eliminated. As a result, in exemplary embodiments, unwanted reduction in PL of exemplary perovskite quantum dots may be avoided. On the other hand, a highly transparent polymer matrix may allow for maintaining photoluminescence quantum yield at a higher level in comparison with other polymer matrices with lower transparencies.

In terms of water-resistance, coating the exemplary perovskite quantum dot/polymer composite with a transparent and water-resistant and atmosphere-resistant polymer, such as PDMS may allow for imparting water-resistant properties to an exemplary perovskite quantum dot/polymer composite while maintaining its photoluminescence quantum yield.

Exemplary quantum dots of the exemplary perovskite nanomaterial-based composite luminescent material exhibit high photoluminescence and may convert light with a wavelength lower than the energy gap of the quantum dots to green light. Therefore, the sensitivity of the exemplary perovskite nanomaterial-based composite luminescent material to the light with wavelengths lower than the energy gap of the quantum dots may be such that the exemplary perovskite nanomaterial-based composite luminescent material may have photoluminescence against ambient light and may emit green light.

In practice, an exemplary stable and water-resistant and atmosphere-resistant perovskite nanomaterial-based composite luminescent material prepared by an exemplary synthesis method according to one or more exemplary embodiments may be utilized in wet or humid environments. For example, an exemplary stable and water-resistant and atmosphere-resistant perovskite nanomaterial-based composite luminescent material may be utilized as a leak detector in oil and gas pipelines, and other industrial vessels. To this end, an exemplary stable water-resistant and atmosphere-resistant perovskite nanomaterial-based composite luminescent material may be added into a pipeline or vessel and any possible leaks within that pipeline may be illuminated due to the presence of the exemplary stable water-resistant and atmosphere-resistant perovskite nanomaterial-based composite luminescent material. As mentioned before, the exemplary perovskite nanomaterial-based composite luminescent material may have photoluminescence against ambient light and may emit green light at the leak position.

Furthermore, since an exemplary stable water-resistant and atmosphere-resistant perovskite nanomaterial-based composite luminescent material may convert light with a wavelength lower than the energy gap of the quantum dots to green light, the exemplary stable water-resistant and atmosphere-resistant perovskite nanomaterial-based composite luminescent material may be utilized for synthesizing a paper-based UV detector. An exemplary synthesis method may include in situ synthesis of an exemplary perovskite quantum dot/polymer composite that may be spin-coated on a paper substrate. An exemplary synthesis method for a UV detector may further include coating or dip coating the exemplary perovskite quantum dot/polymer composite on the exemplary paper substrate with a water-resistant and atmosphere-resistant and transparent polymer, such as PDMS.

Figure 1:
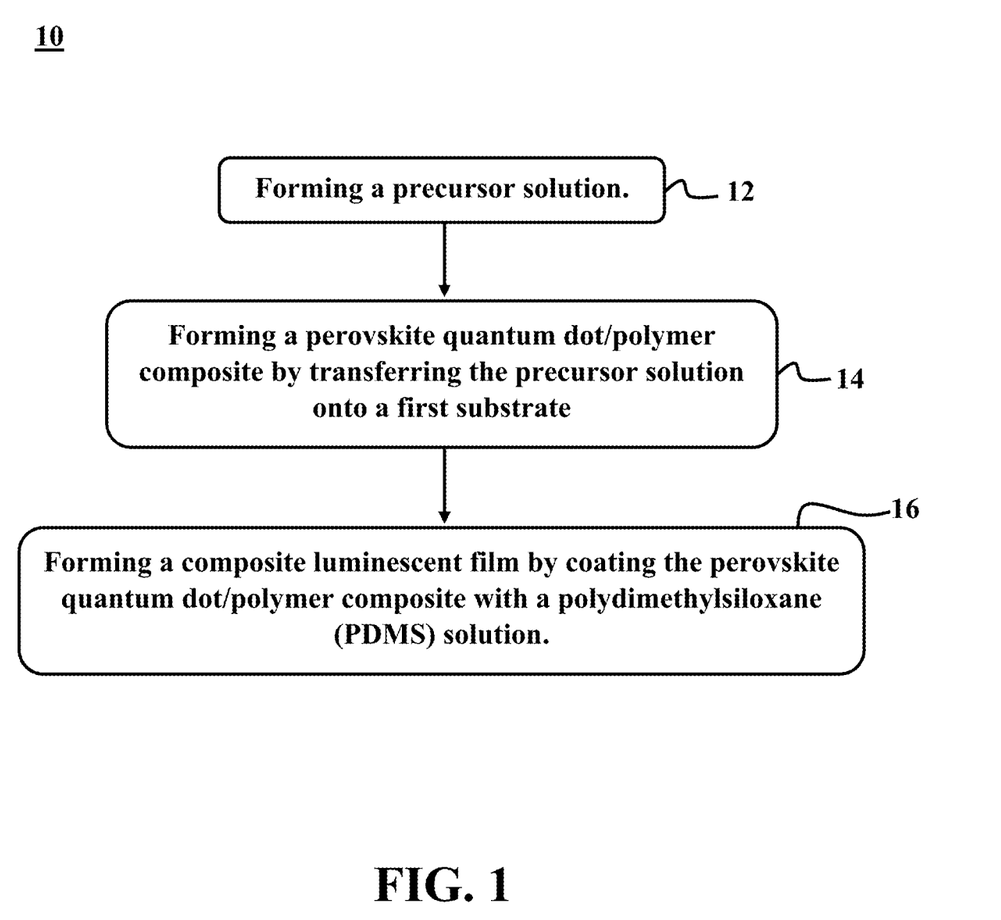
FIG. 1 illustrates a flowchart of a method for synthesizing a composite luminescent material, consistent with one or more exemplary embodiments of the present disclosure.

FIG. 1 illustrates a flowchart of a method 10 for synthesizing a composite luminescent material, consistent with one or more exemplary embodiments of the present disclosure. In an exemplary embodiment, method 10 may include a step 12 of forming a precursor solution, a step 14 of forming a perovskite quantum dot/polymer composite by transferring the prepared precursor solution onto a first substrate, and a step 16 of forming a composite luminescent material by coating the perovskite quantum dot/polymer composite with a PDMS solution.

Figure 2:
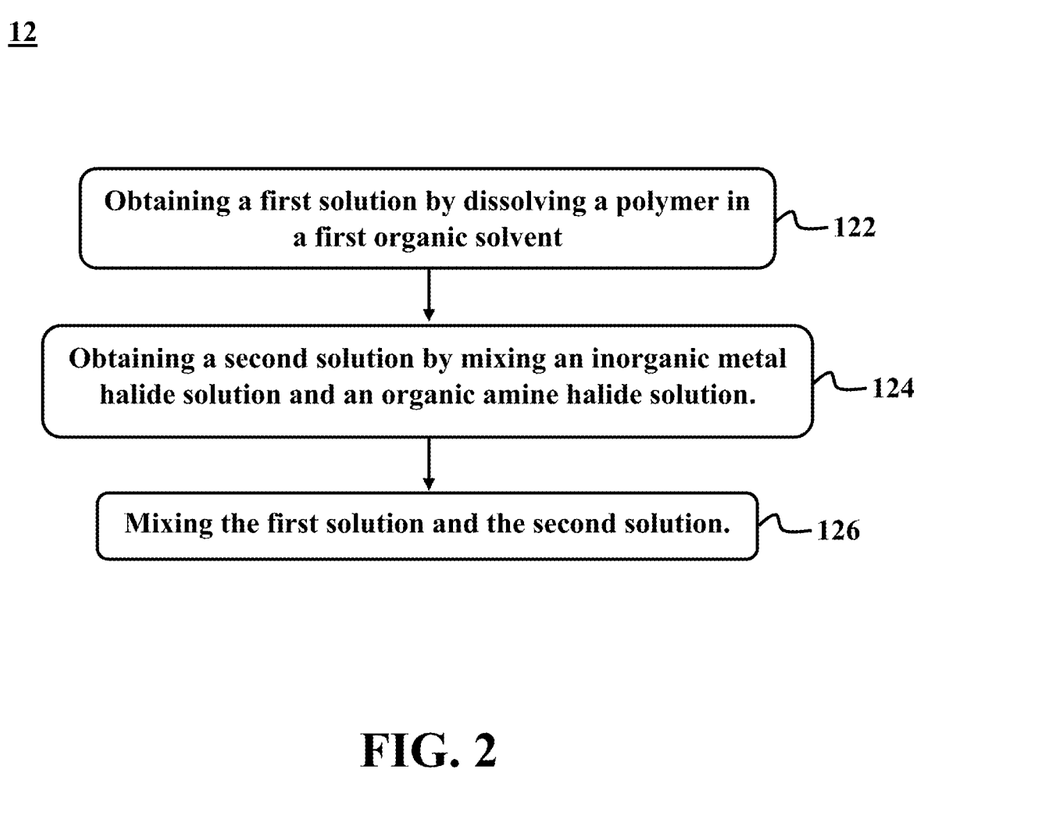
FIG. 2 illustrates a flowchart for forming a precursor solution, consistent with one or more exemplary embodiments of the present disclosure.

FIG. 2 illustrates a flowchart for forming a precursor solution, consistent with one or more exemplary embodiments of the present disclosure. Specifically, in an exemplary embodiment, FIG. 2 provides details of step 12 of FIG. 1. In an exemplary embodiment, step 12 of forming a precursor solution may include a step 122 of obtaining a first solution by dissolving a polymer in a first organic solvent, a step 124 of obtaining a second solution by mixing an inorganic metal halide solution and an organic amine halide solution, and a step 126 of mixing the first solution and the second solution.

In an exemplary embodiment, step 122 may include obtaining a first solution by dissolving a polymer in a first organic solvent. In an exemplary embodiment, obtaining a first solution by dissolving a polymer in a first organic solvent may include mixing the polymer with the first organic solvent utilizing a mixer, such as a magnetic stirrer. In an exemplary embodiment, obtaining a first solution by dissolving a polymer in a first organic solvent may include mixing the polymer powder with the first organic solvent and stirring the mixture at room temperature for a predetermined amount of time, for example 24 hr. An exemplary polymer may be at least one of PVP, polyvinylidene fluoride (PVDF), copolymers of polyvinylidene fluoride, polyacrylonitrile (PAN), polyvinyl acetate (PVAc) Cellulose acetate (CA), cyano cellulose (CNA), polysulfone (PSF), aromatic polyamide (PA), polyimide (PI), polycarbonate (PC), polystyrene (PS). In an exemplary embodiment, the polymer may be PVP due to its superior transparency in comparison with other similar polymers. Specifically, PVP, among other advantageous properties, has the same solvent system as the precursor materials for perovskite quantum dots, excellent piezoelectric properties, dielectric properties, and mechanical properties. In an exemplary embodiment, the first organic solvent may include at least one of N,N-dimethylformamide (DMF), dimethylsulfoxide (DMSO), trimethylphosphate (TMP), triethyl phosphate (TEP), N-methylpyrrolidone (NMP), and dimethylacetamide (DMAc). In an exemplary embodiment, step 122 may include obtaining a first solution by dissolving a polymer in a first organic solvent, where the first solution may have a concentration between 100 and 300 mg/ml.

In an exemplary embodiment, step 124 may include obtaining a second solution by mixing an inorganic metal halide solution and an organic amine halide solution. An exemplary inorganic metal halide solution may be prepared by dissolving an inorganic metal halide in a second organic solvent. An exemplary organic amine halide solution may be prepared by dissolving an organic amine halide in the second organic solvent. In an exemplary embodiment, an exemplary second organic solvent may be miscible with an exemplary first organic solvent. For example, an exemplary second organic solvent may be at least one of N,N-dimethylformamide (DMF), dimethylsulfoxide (DMSO), trimethylphosphate (TMP), triethyl phosphate (TEP), N-methylpyrrolidone (NMP), In an exemplary embodiment, an exemplary organic amine halide solution may be prepared by dissolving an organic amine halide, such as $CH_3NH_3Br$, $CH_3NH_3Cl$, or $CH_3NH_3I$ in the second organic solvent that may be one of DMF, DMSO, TMP, TEP, NMP, or DMAc. In an exemplary embodiment, an exemplary organic amine halide solution may have a concentration between 1.25 and 2.5 M. In an exemplary embodiment, an exemplary inorganic metal halide solution may be prepared by dissolving an inorganic metal halide, such as $PbBr_2$, $PbCl_2$, $PbI_2$, $SnBr_2$, $SnCl_2$, or $SnI_2$ in the second organic solvent that may be one of DMF, DMSO, TMP, TEP, NMP, or DMAc. In an exemplary embodiment, an exemplary inorganic metal halide solution may have a concentration between 1 and 1.2M.

In an exemplary embodiment, step 124 may include obtaining a second solution by mixing an inorganic metal halide solution and an organic amine halide solution with an (inorganic metal halide solution:organic amine halide solution) molar ratio between 1:1.25 and 1:2.5. In an exemplary embodiment, the organic halide solution may be a $CH_3NH_3Br$ solution that may be obtained by dissolving $CH_3NH_3Br$ in DMF. In an exemplary embodiment, an exemplary $CH_3NH_3Br$ solution may have a concentration between 1.25 and 2.5 M. In an exemplary embodiment, the inorganic metal halide solution may be a $PbBr_2$ solution that may be obtained by dissolving $PbBr_2$ in DMF. In an exemplary embodiment, an exemplary $PbBr_2$ solution may have a concentration between 1 and 1.2 M. In an exemplary embodiment, step 124 may include obtaining a second solution by mixing a $PbBr_2$ solution and a $CH_3NH_3Br$ solution with a molar ratio ($PbBr_2$:$CH_3NH_3Br$) between 1.1.25:1.2.5.

In an exemplary embodiment, step 126 may include mixing the first solution and the second solution. In an exemplary embodiment, the first solution and the second solution may be mixed to obtain a uniform organic solvent system, due to the fact that the first organic solvent and the second organic solvent may be selected such that the second organic solvent may be miscible with the first organic solvent. In other words, when the first organic solvent and the second organic solvent are mixed, no phase separation occurs within the system. Therefore, the solubility of an exemplary metal halide, an exemplary organic amine halide, and an exemplary polymer that may be dissolved in the first solution and the second solution may not be significantly different in the first organic solvent and the second organic solvent. In an exemplary embodiment, the first organic solvent and the second organic solvent may be similar.

In an exemplary embodiment, step 126 may include mixing the first solution and the second solution such that a concentration of the polymer within the obtained mixture of the first solution and the second solution may be between 23 to 30 vol. %. In an exemplary embodiment, step 126 may include mixing a PVP solution with a solution containing $PbBr_2$ and $CH_3NH_3Br$, such that a concentration of PVP within the obtained mixture of the PVP solution and the solution containing $PbBr_2$ and $CH_3NH_3Br$ may be between 23 to 30 vol. %.

In an exemplary embodiment, step 12 may include forming a precursor solution through performing steps 122 to 126, where the precursor solution may contain 23 to 30 vol. % of a polymer. In an exemplary embodiment, an exemplary precursor solution may be obtained by mixing a PVP solution and a solution containing $PbBr_2$ and $CH_3NH_3Br$ with a molar ratio ($PbBr_2$:$CH_3NH_3Br$) between 1.1.25:1.2.5. In an exemplary embodiment, step 126 may include mixing the first solution and the second solution at a temperature between 25 and 70° C.

In an exemplary embodiment, step 14 may include forming a perovskite quantum dot/polymer composite by transferring the prepared precursor solution onto a first substrate. In an exemplary embodiment, transferring the exemplary precursor solution onto the exemplary first substrate may include spin-coating the exemplary precursor solution on to an exemplary first substrate. In an exemplary embodiment, transferring the precursor solution onto a first substrate may include pouring the precursor solution onto the first substrate and then spinning the substrate at a rate between 1000 rpm to 5000 rpm. In an exemplary embodiment, step 14 of forming a perovskite quantum dot/polymer composite may further include preheating the first substrate to a temperature of at most 80° C. The first substrate may be preheated before transferring the precursor solution onto the first substrate. In an exemplary embodiment, step 14 of forming a perovskite quantum dot/polymer composite may further include heating the transferred precursor solution on the substrate at a temperature of at most 120° C. for a predetermined period. In an exemplary embodiment, the predetermined period may be a period of 4 seconds to 5 minutes. In an exemplary embodiment, an exemplary first substrate may include glass, paper, or polyethylene terephthalate (PET).

In an exemplary embodiment, step 16 may comprise of forming a composite luminescent material by coating a perovskite quantum dot/polymer composite with a PDMS solution. In an exemplary embodiment, coating the perovskite quantum dot/polymer composite with the PDMS solution may include dip coating the exemplary perovskite quantum dot/polymer composite electrospun on the exemplary first substrate into the PDMS solution. In an exemplary embodiment, an exemplary PDMS solution for performing the aforementioned dip coating may have a concentration between 100 and 50 vol. % in PDMS solvents such as toluene, hexane, or heptane.

In an exemplary embodiment, step 16 of forming a composite luminescent material by coating the perovskite quantum dot/polymer composite with a PDMS solution may include separating the exemplary perovskite quantum dot/polymer composite from the exemplary first substrate as a dried powder, mixing the obtained dried powder with a PDMS solution, and then spin-coating the mixture onto a second substrate. In an exemplary embodiment, an exemplary second substrate may include glass, paper, or PET. In an exemplary embodiment, the obtained dried powder of the exemplary perovskite quantum dot/polymer composite may be mixed with an exemplary PDMS solution such that concertation of the exemplary perovskite quantum dot/polymer composite within the obtained mixture may be between 0.2 wt. % and 0.3 wt. % based on pure PDMS. In an exemplary embodiment, the exemplary PDMS solution may have a concentration between 100 vol. % and 70 vol. % in PDMS solvents such as toluene, hexane, or heptane.

Synthesizing an Exemplary Composite Luminescent Material

In this example, an exemplary composite luminescent material was synthesized utilizing exemplary method 10.

A first solution was obtained by dissolving 0.2 mg of PVP in 1 mL of a 1 M anhydrous DMF solution. An inorganic metal halide solution was prepared by dissolving 267 mg of $PbBr_2$ in 1000 µL of an anhydrous DMF solution. An organic amine halide solution was prepared by dissolving 111.7 mg of $CH_3NH_3Br$ in 1000 µL of an anhydrous DMF solution. A second solution was obtained by mixing the prepared inorganic metal halide solution with the prepared organic amine halide solution with a molar ratio ($PbBr_2$:$CH_3NH_3Br$) of 1:1.25. The average size of the perovskite particles that may be produced in situ utilizing the prepared precursor solution may depend on the molar ratio of $PbBr_2$ to $CH_3NH_3Br$. In exemplary embodiments, the average size of the perovskite particles may be adjusted by changing the molar ratio of $PbBr_2$ to $CH_3NH_3Br$. In this example, in order to prepare perovskite quantum dots, a molar ratio ($PbBr_2$:$CH_3NH_3Br$) of 1:1.25 is utilized for preparing the second solution.

Different precursor solutions were obtained by mixing different amounts of the first solution and the second solution. Four different precursor solutions were prepared with PVP concentrations of 0, 13, 19, and 27 vol. % based on the total volume of the prepared precursor solution.

After forming the precursor solutions, as was described in the previous paragraph, the precursor solutions may be poured on cleaned and dried glass substrates. Subsequently, the precursor solutions may be spin-coated on the cleaned and dried glass substrates at 3000 rpm for 40 s to obtain four different perovskite quantum dot/polymer composites containing different amounts of PVP.

Figure 3A:
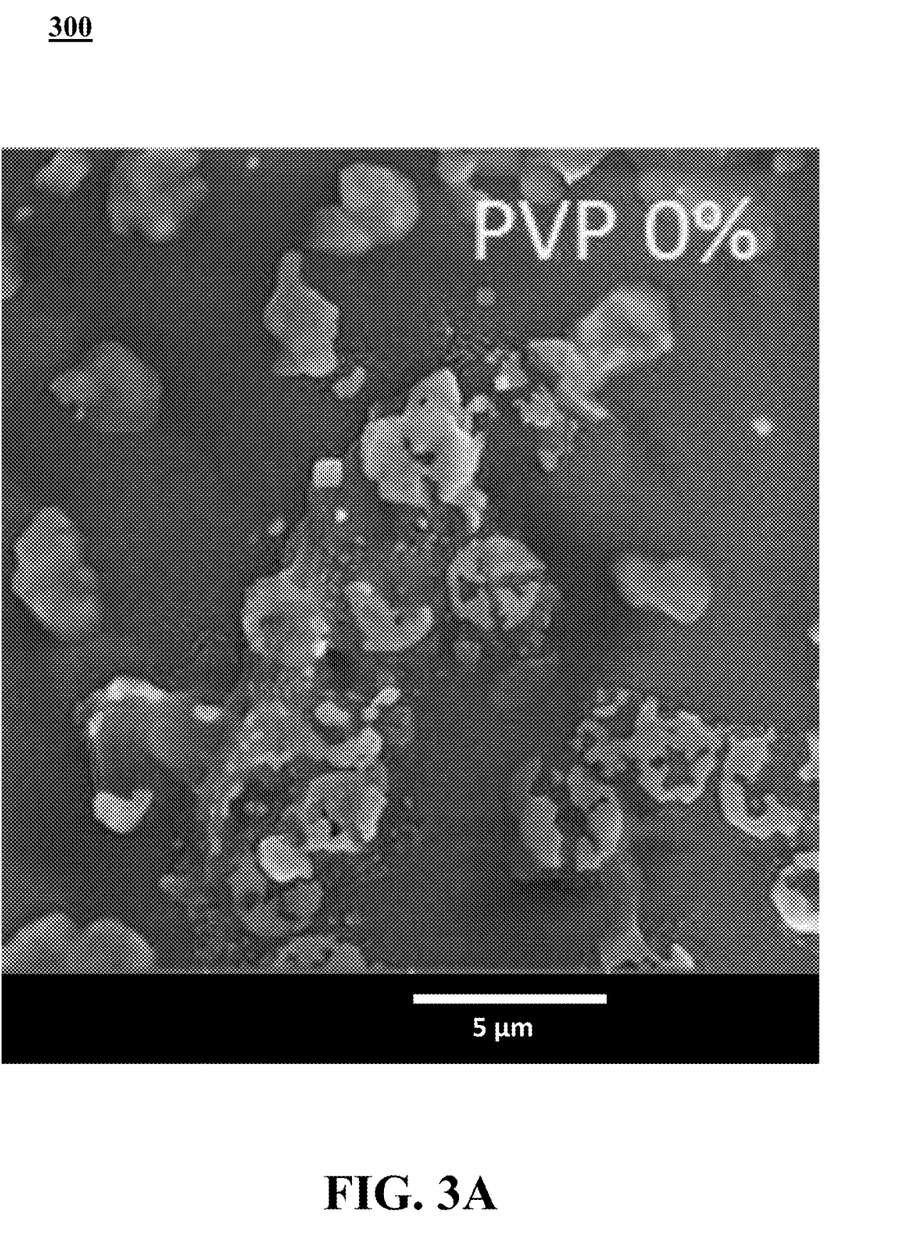
FIGS. 3A-3D show scanning electron microscope (SEM) images of perovskite quantum dot/polymer composites synthesized with precursor solutions containing different concentrations of PVP, consistent with one or more exemplary embodiments of the present disclosure.
Figure 3B:
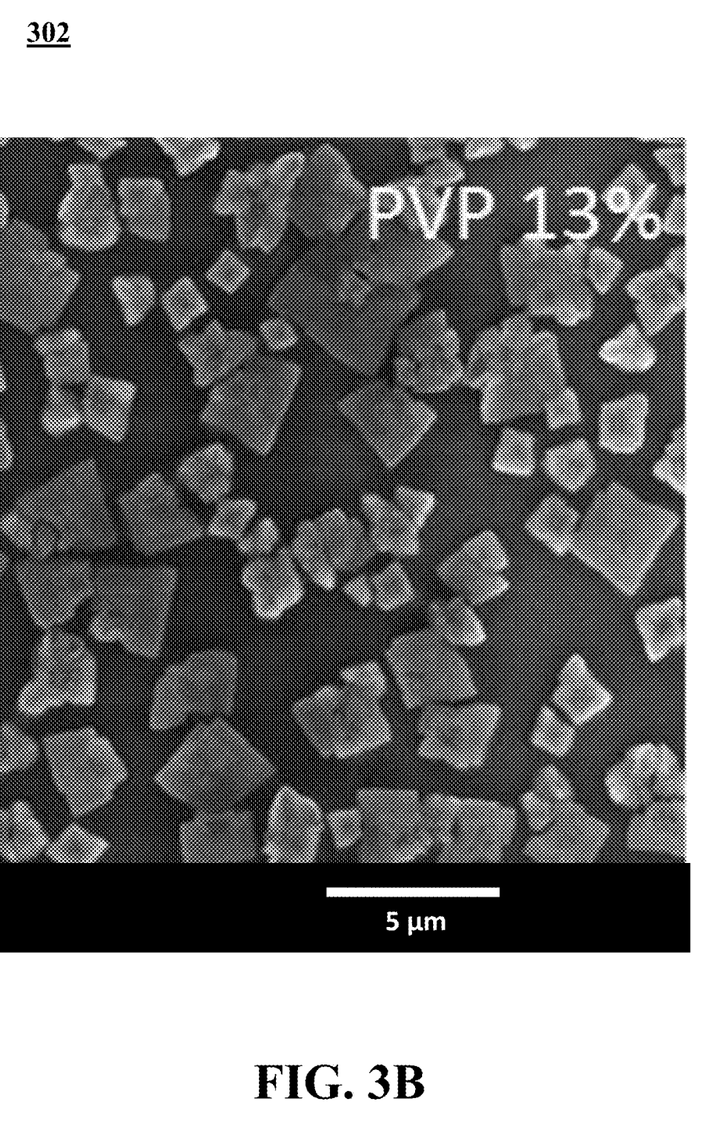
Figure 3C:
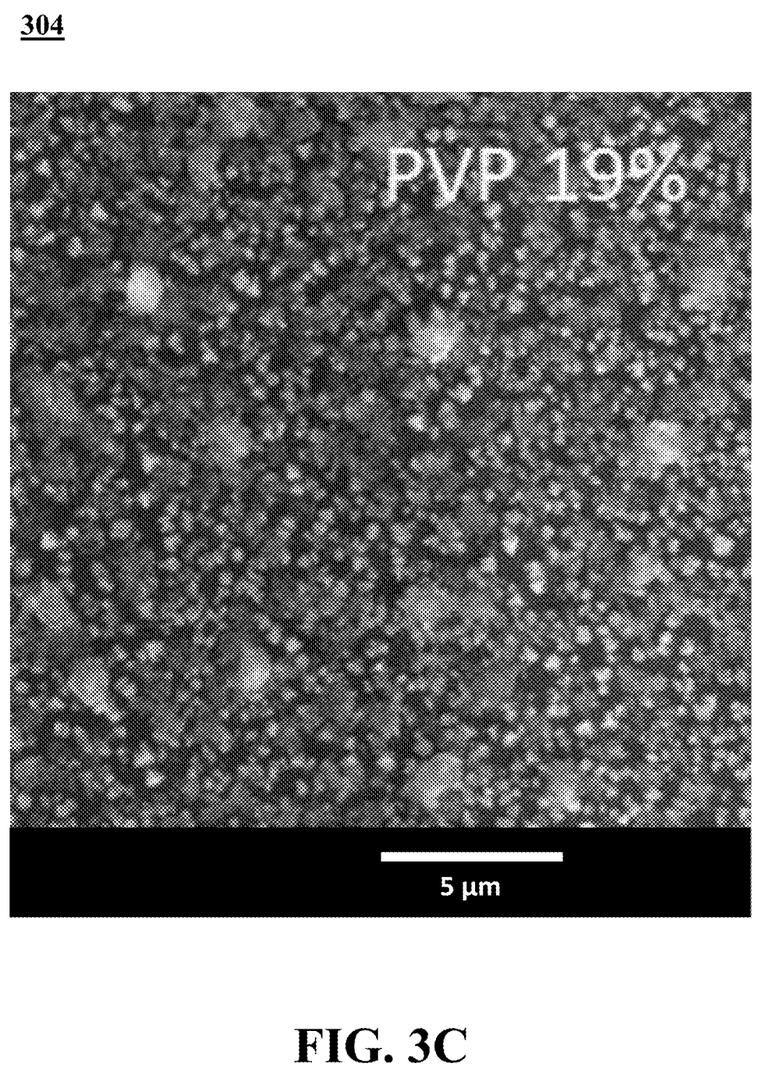
Figure 3D:
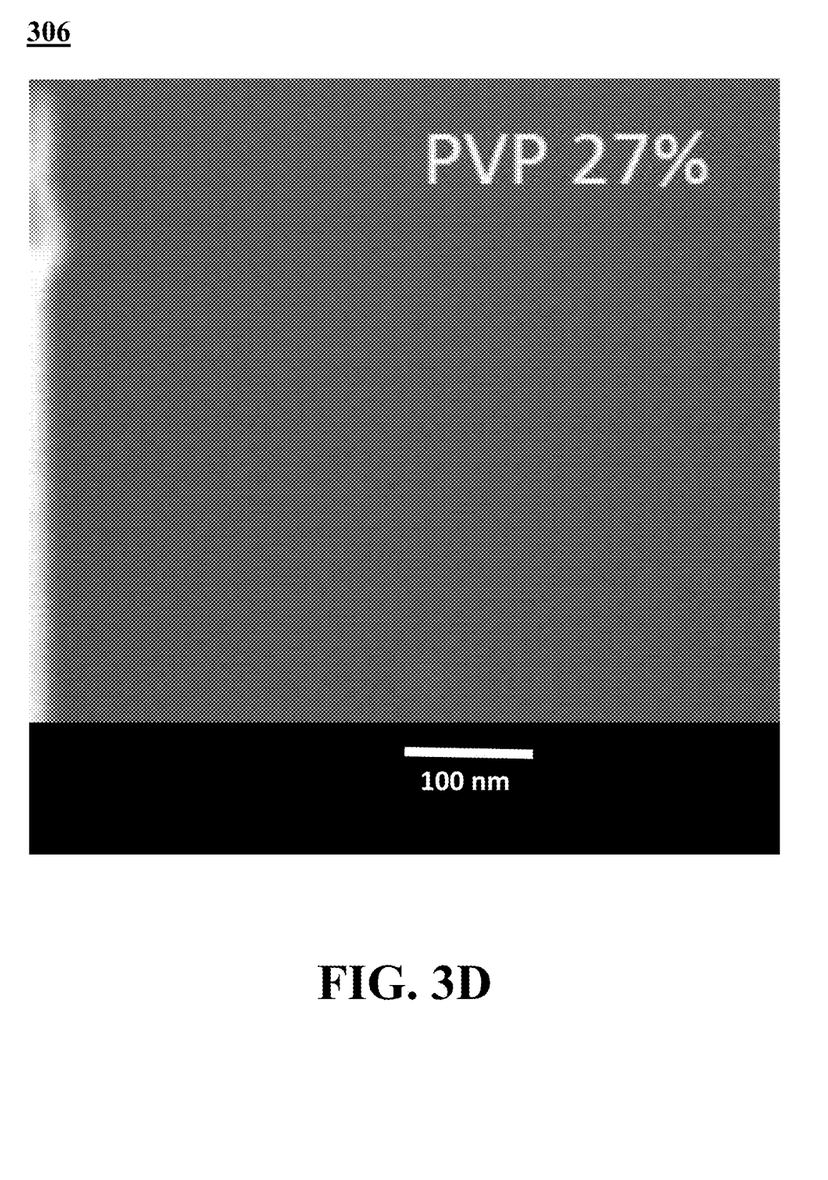

FIGS. 3A-3D show scanning electron microscope (SEM) images of perovskite quantum dot/polymer composites synthesized with precursor solutions containing different concentrations of PVP, consistent with one or more exemplary embodiments of the present disclosure. Specifically, FIG. 3A illustrates an SEM image 300 of a perovskite quantum dot/polymer composite synthesized with a precursor solution containing 0 vol. % of PVP. FIG. 3B illustrates an SEM image 302 of a perovskite quantum dot/polymer composite synthesized with a precursor solution containing 13 vol. % PVP. FIG. 3C illustrates an SEM image 304 of a perovskite quantum dot/polymer composite synthesized with a precursor solution containing 19 vol. % PVP. FIG. 3D illustrates an SEM image 306 of a perovskite quantum dot/polymer composite synthesized with a precursor solution containing 27 vol. % PVP.

Referring to FIGS. 3A-3D, it is evident that in this example, the grain sizes of the synthesized perovskite quantum dot/polymer composites may be controlled by changing the PVP concentration within the precursor solutions. Specifically, an increase in PVP concentration within the precursor solution may lead to a decrease in the grain size of a synthesized perovskite quantum dot/polymer composite. For example, as observed in FIG. 3D, in an exemplary embodiment, a layer of perovskite quantum dots was formed in the presence of 27 vol. % of PVP. PVP is an amorphous polymer with high transparency due to its low crystallinity. Accordingly, a perovskite quantum dot/polymer composite synthesized by in situ formations of perovskite quantum dots within a PVP matrix may be efficiently utilized in optoelectronic devices.

Figure 4:
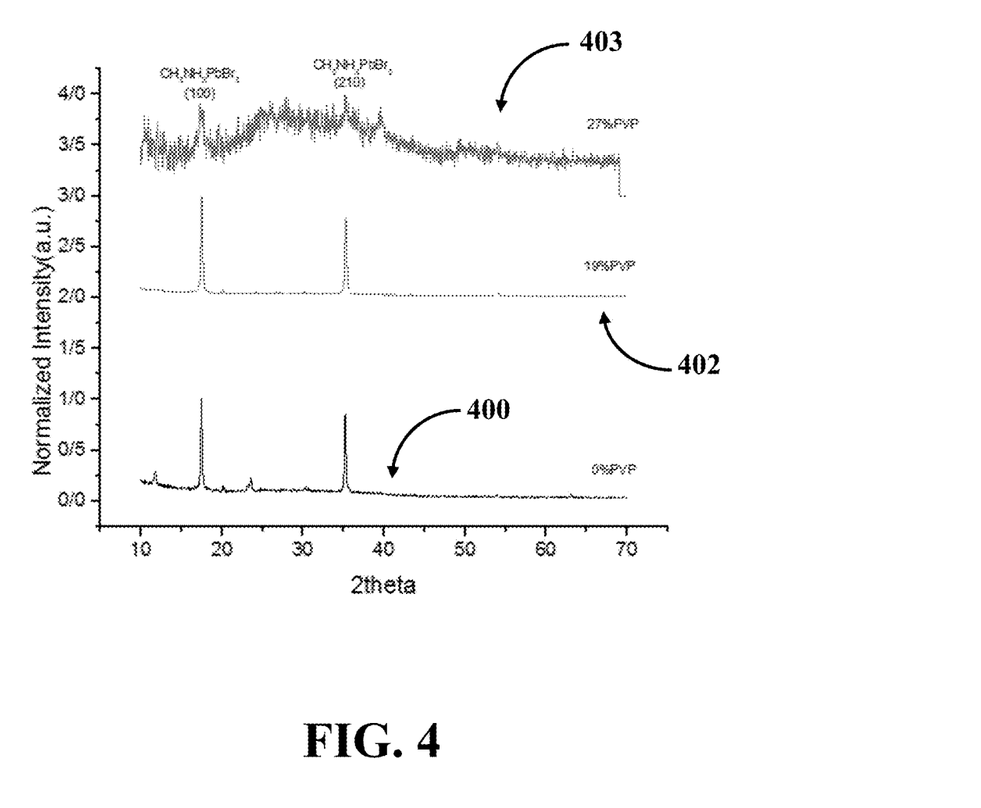
FIG. 4 shows X-ray diffraction (XRD) spectra of perovskite quantum dot/polymer composites synthesized with precursor solutions containing different concentrations of PVP, consistent with one or more exemplary embodiments of the present disclosure.

FIG. 4 shows X-ray diffraction (XRD) spectra of perovskite quantum dot/polymer composites synthesized with precursor solutions containing different concentrations of PVP, consistent with one or more exemplary embodiments of the present disclosure. Specifically, FIG. 4 shows an XRD spectrum 400 of a perovskite quantum dots film, an XRD spectrum 402 of a perovskite quantum dot/polymer composite synthesized utilizing a precursor solution containing 19 vol. % of PVP and an XRD spectrum 404 of a perovskite quantum dot/polymer composite synthesized utilizing a precursor solution containing 27 vol. % of PVP. As evident in FIG. 4, a reduction in crystallite size to less than 10 nm occurs in the presence of 27 vol. % of PVP. Table 1 below summarizes the crystallite sizes of different perovskite quantum dot/polymer composites synthesized in this example. The crystallite sizes are estimated utilizing the Scherer equation.

TABLE 1

| Composition | Crystal Structure | Crystal Size |
| --- | --- | --- |
| With-out PVP | Cubic | 50(nm) |
| 13% PVP | Cubic | 35(nm) |
| 19% PVP | Cubic | 25(nm) |
| 27% PVP | Cubic | 5-8(nm) |

Figure 5:
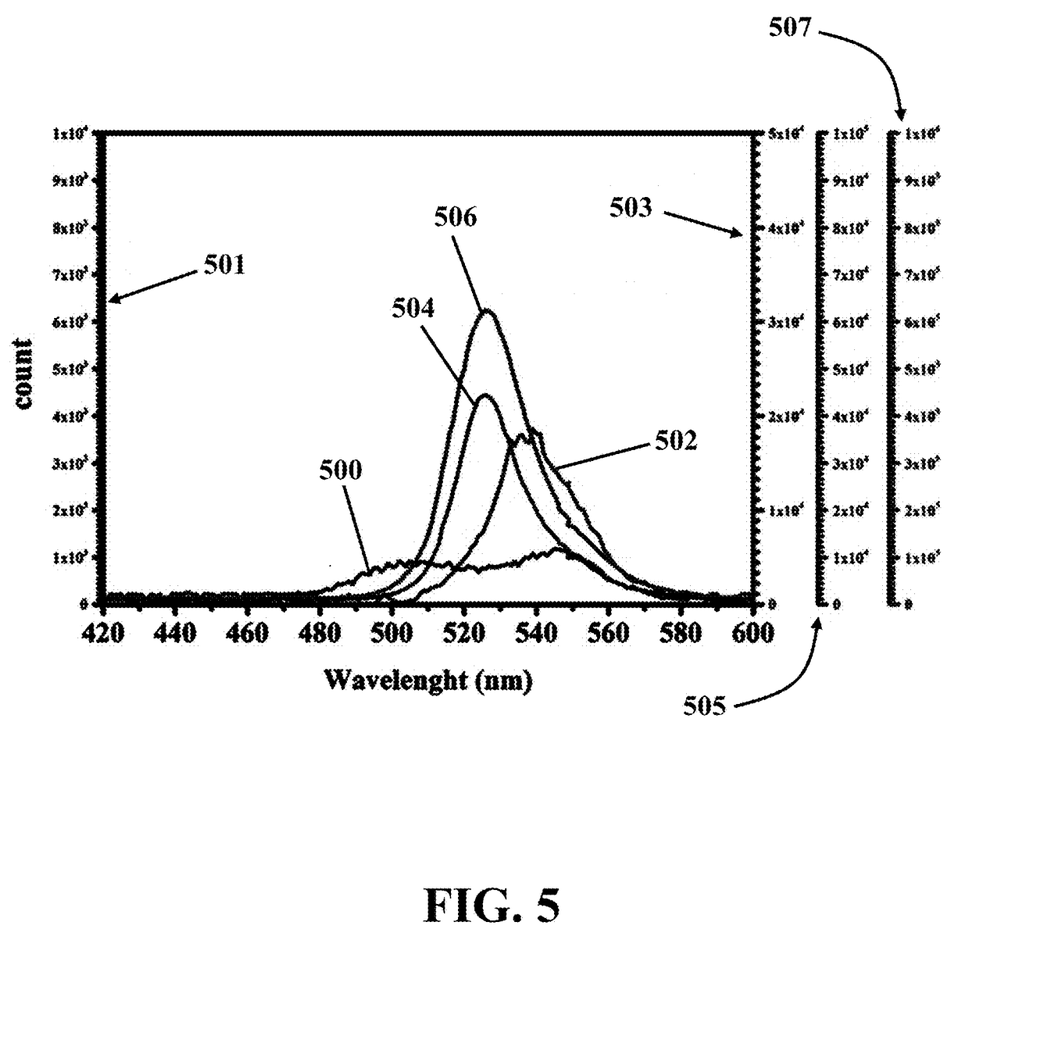
FIG. 5 shows photoluminescent (PL) spectra of perovskite quantum dot/polymer composites synthesized with precursor solutions containing different concentrations of PVP, consistent with one or more exemplary embodiments of the present disclosure.

FIG. 5 shows photoluminescent (PL) spectra of perovskite quantum dot/polymer composites synthesized with precursor solutions containing different concentrations of PVP, consistent with one or more exemplary embodiments of the present disclosure. Specifically, FIG. 5 shows PL spectrum 500 of a perovskite quantum dot/polymer composite synthesized with a precursor solution containing 0 vol. % PVP, PL spectrum 502 of a perovskite quantum dot/polymer composite synthesized with a precursor solution containing 13 vol. % PVP, PL spectrum 504 of a perovskite quantum dot/polymer composite synthesized with a precursor solution containing 19 vol. % PVP, and PL spectrum 506 of a perovskite quantum dot/polymer composite synthesized with a precursor solution containing 27 vol. % PVP. It should be noted that in FIG. 5, axis 501 shows corresponding counts for PL spectrum 500, axis 503 shows corresponding counts for PL spectrum 502, axis 505 shows corresponding counts for PL spectrum 504, and axis 507 shows corresponding counts for PL spectrum 506. PLQY as one of the main characteristics of luminescent materials may refer to number of photons emitted by a photoluminescent material per number of incident photons. PLQY may show the efficiency of an exemplary photoluminescent material in energy conversion. Generally, the intensity of the incident light can affect the output PL intensity of a photoluminescent material. Some photoluminescent materials may not able to show a high PL intensity of high PLQY when they are illuminated by a low-intensity light source. However, in this example, it is evident from FIG. 5 that as-synthesized composite photoluminescent materials may be highly sensitive with a high PLQY. The exemplary composite photoluminescent materials may convert almost all of the incident light to green light. Furthermore, the exemplary composite photoluminescent materials show high PLQY even at low intensities of the incident light.

In this example, the as-synthesized perovskite quantum dot/polymer composites were coated with PDMS. In this exemplary embodiment, PDMS may be a Sylgard 184 that may include a base and a curing agent. In an exemplary embodiment, the exemplary base and the exemplary curing agent may be present with a ratio of 10 to 1. After synthesizing perovskite quantum dot/polymer composites on glass substrates, perovskite quantum dot/polymer powders were obtained by separating the synthesized perovskite quantum dot/polymer composites from the glass substrate, by, for example, scraping the synthesized perovskite quantum dot/polymer composites off of the glass substrate. In an exemplary embodiment, 0.005 g of an exemplary perovskite quantum dot/polymer powder was mixed with 0.5 g of pure PDMS for 30 minutes. In this example, the exemplary perovskite quantum dot/polymer powder was mixed with the PDMS solution, such that the concentration of the exemplary perovskite quantum dot/polymer composite was 1 wt. % based on the total weight of the obtained mixture. After mixing the exemplary perovskite quantum dot/polymer powder with the PDMS solution, various stable films with different thicknesses, shapes, and sizes may be formed. For example, a stable film with a thickness of 300 µm may be formed by casting the exemplary mixture of the exemplary perovskite quantum dot/polymer powder and the exemplary PDMS solution. However, in order to obtain a thinner film, a suitable solvent, such as hexane or toluene may be added to the exemplary mixture of the exemplary perovskite quantum dot/polymer powder and the exemplary PDMS solution, and then the mixture may be spin-coated on a substrate. For example, 20 vol. % of toluene or hexane may be added to the exemplary mixture of the exemplary perovskite quantum dot/polymer powder and the exemplary PDMS solution. The obtained mixture may then be spin-coated on a substrate at 1000 rpm. Subsequently, to solidify or cure the obtained films, they were heated at 70° C. for 3 hours.

In this example, an exemplary composite luminescent material was synthesized that contained a PDMS coating. In exemplary embodiments, high transparency of PDMS may allow for completely reserving the optical properties of perovskite nanomaterials. In exemplary embodiments, hydrophobic features of PDMS may allow for maintaining the optical properties of the exemplary composite luminescent material in wet environments.

In exemplary embodiments, as-synthesized composite luminescent materials may be utilized for leak detection in fluid handling vessels and equipment. As was discussed in the preceding sections, perovskite quantum dots of an exemplary composite luminescent material may have a high PL and may convert light with a lower wave-length than the energy gap of the exemplary perovskite quantum dots to a green light. In other words, an exemplary composite luminescent material may be light-sensitive provided that the light has a wavelength lower than the energy gap of the exemplary perovskite quantum dots. Accordingly, this light sensitivity of the exemplary composite luminescent materials may be benefited from in leak detection applications, according to one or more exemplary embodiments of the present disclosure.

According to one or more embodiments, the present disclosure is directed to a method for leak detection in fluid handling vessels. An exemplary method for leak detection may include synthesizing a composite luminescent material, injecting the composite luminescent material into a fluid handling vessel, and illuminating the fluid handling vessel or a portion of the fluid handling vessel with UV light. In exemplary embodiments, any possible leaks within the exemplary fluid handling vessel may emit green light in response to the UV light. This emission of green light is due to the presence of the synthesized composite luminescent material inside the fluid handling vessel. An exemplary method for leak detection may further include discharging the exemplary composite luminescent material from the fluid handling vessel. In exemplary embodiments, a fluid handling vessel may be a pipe, an open tank, storage vessels, and other similar equipment. In an exemplary embodiment, synthesizing a composite luminescent material may be carried out by method 100.

Figure 6:
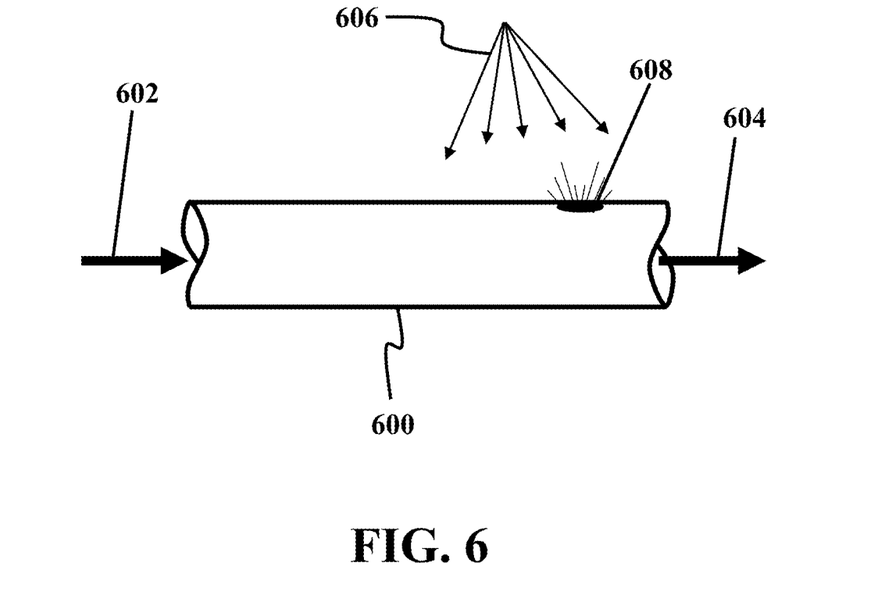
FIG. 6 illustrates a schematic of a pipe section, consistent with one or more exemplary embodiments of the present disclosure.

FIG. 6 illustrates a schematic of a pipe section 600, consistent with one or more exemplary embodiments of the present disclosure. In an exemplary embodiment, an exemplary composite luminescent material may be added to an upstream fluid flow 602 flowing into pipe section 600. In exemplary embodiments, high transparency and hydrophobic features of PDMS of the exemplary composite luminescent material may allow for adding the exemplary composite luminescent material into pipe section 600 as a luminescent-based leak detector. To this end, ultraviolet (UV) light 606 may be shone on pipe section 600. Any possible leak in pipe section 600 may emit green light, due to the presence of the exemplary composite luminescent material in the fluid stream within pipe section 600. This green light emission in leak site 608 is due to the fact that at leak site 608, the exemplary composite luminescent material may be exposed to UV light 606. Consequently, the exemplary composite luminescent material may convert UV light 606 into a green light that shines through leak site 608. In an exemplary embodiment, the exemplary composite luminescent material may be easily collected from a downstream fluid flow 604 flowing out of pipe section 600.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments but should be defined only in accordance with the following claims and their equivalents.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

Moreover, the word "substantially" when used with an adjective or adverb is intended to enhance the scope of the particular characteristic; e.g., substantially planar is intended to mean planar, nearly planar and/or exhibiting characteristics associated with a planar element. Further use of relative terms such as "vertical", "horizontal", "up", "down", and "side-to-side" are used in a relative sense to the normal orientation of the apparatus.

What is claimed is:

1. A method for synthesizing a composite luminescent material, the method comprising:
    forming a precursor solution by:
        obtaining a first solution by dissolving a polymer in a first organic solvent, the polymer comprising polyvinylpyrrolidone (PVP);
        obtaining a second solution by mixing an inorganic metal halide solution and an organic amine halide solution; and
        mixing the first solution and the second solution;
    forming a perovskite quantum dot/polymer composite powder by:
        spin-coating the precursor solution onto a paper substrate; and
        separating the formed perovskite quantum dot/polymer composite from the paper substrate; and
    forming a composite luminescent material by:
        obtaining a third solution by mixing the perovskite quantum dot/polymer composite powder with a polydimethylsiloxane (PDMS) solution; and
        spin-coating the third solution onto a second substrate.

2. A method for synthesizing a composite luminescent material, the method comprising:
    forming a precursor solution by:
        obtaining a first solution by dissolving a polymer in a first organic solvent;
        obtaining a second solution by mixing an inorganic metal halide solution and an organic amine halide solution; and
        mixing the first solution and the second solution;
    forming a perovskite quantum dot/polymer composite powder by:
        spin-coating the precursor solution onto a paper substrate; and
        separating the formed perovskite quantum dot/polymer composite from the paper substrate; and
    forming a composite luminescent material by coating the perovskite quantum dot/polymer composite powder with a PDMS solution.

3. The method according to claim 2, wherein coating the perovskite quantum dot/polymer composite powder with the PDMS solution comprises:

obtaining a third solution by mixing the perovskite quantum dot/polymer composite powder with a PDMS solution; and spin-coating the third solution onto a second substrate.

4. The method according to claim 3, wherein obtaining the third solution comprises mixing the perovskite quantum dot/polymer composite powder with the PDMS solution, the third solution comprising between 0.2 wt. % and 3 wt. % of perovskite quantum dot/polymer composite powder based on pure PDMS.

5. The method according to claim 4, wherein obtaining the first solution comprises dissolving polyvinylpyrrolidone (PVP) in the first organic solvent.

6. The method according to claim 5, wherein mixing the first solution and the second solution comprises obtaining a mixture by mixing the first solution and the second solution, the mixture comprising 23 to 30 vol. % of PVP.

7. The method according to claim 4, wherein the first organic solvent comprises at least one of N,N-dimethylformamide (DMF), dimethylsulfoxide (DMSO), trimethylphosphate (TMP), triethylphosphate (TEP), N-methylpyrrolidone (NMP), and dimethylacetamide (DMAc).

8. The method according to claim 4, wherein obtaining the second solution comprises mixing the inorganic metal halide solution and the organic amine halide solution with a ratio (inorganic metal halide:organic amine halide) between 1:1.25 and 1:2.5.

9. The method according to claim 8, wherein obtaining the second solution comprises mixing the inorganic metal halide solution and the organic amine halide solution, the inorganic metal halide solution obtained by dissolving $PbBr_2$ in an organic solvent.

10. The method according to claim 8, wherein obtaining the second solution comprises mixing the inorganic metal halide solution and the organic amine halide solution, the organic amine halide solution obtained by dissolving $CH_3NH_3Br$ in an organic solvent.

11. The method according to claim 2, wherein transferring the precursor solution onto the first substrate comprises transferring the precursor solution onto a paper substrate.

12. The method according to claim 11, wherein coating the perovskite quantum dot/polymer composite powder with the PDMS solution comprises mixing the perovskite quantum dot/polymer composite powder with the PDMS solution.

13. The method according to claim 12, wherein obtaining the first solution comprises dissolving polyvinylpyrrolidone (PVP) in the first organic solvent.

14. The method according to claim 13, wherein mixing the first solution and the second solution comprises obtaining a mixture by mixing the first solution and the second solution, the mixture comprising 23 to 30 vol. % of PVP.

15. The method according to claim 12, wherein the first organic solvent comprises at least one of DMF, DMSO, TMP, TEP, NMP, and DMAc.

16. The method according to claim 12, wherein obtaining the second solution comprises mixing the inorganic metal halide solution and the organic amine halide solution with a ratio (inorganic metal halide:organic amine halide) between 1:1.25 and 1:2.5.

17. The method according to claim 12, wherein obtaining the second solution comprises mixing the inorganic metal halide solution and the organic amine halide solution, the inorganic metal halide solution obtained by dissolving $PbBr_2$ in an organic solvent.

18. The method according to claim 17, wherein obtaining the second solution comprises mixing the inorganic metal halide solution and the organic amine halide solution, the organic amine halide solution obtained by dissolving $CH_3NH_3Br$ in an organic solvent.

19. The method according to claim 2, wherein transferring the precursor solution onto the first substrate comprises spin-coating the precursor solution onto the first substrate, the spin-coating carried out at 1000 rpm to 5000 rpm.

20. The method according to claim 2, wherein forming the perovskite quantum dot/polymer composite powder further comprises preheating the first substrate to a temperature of at most 80° C. and heating the transferred precursor solution on the first substrate at a temperature of at most 120° C. for a period of 4 seconds to 5 minutes.

\* \* \* \* \*